(12) United States Patent
Guay et al.

(10) Patent No.: US 12,275,591 B1
(45) Date of Patent: Apr. 15, 2025

(54) FRAMEWORK WITH TOOL-FREE CHANGEOVER MOUNTINGS FOR IDLERS

(71) Applicant: NHI Mechanical Motion, LLC, Claremont, NH (US)

(72) Inventors: Kevin J. Guay, Claremont, NH (US); Zach D. Richardson, Alstead, NH (US)

(73) Assignee: NHI Mechanical Motion, LLC, Claremont, NH (US)

( * ) Notice: Subject to any disclaimer, the term of this patent is extended or adjusted under 35 U.S.C. 154(b) by 69 days.

(21) Appl. No.: 18/109,479

(22) Filed: Feb. 14, 2023

(51) Int. Cl.
  *B65G 13/12* (2006.01)
  *B65G 39/12* (2006.01)

(52) U.S. Cl.
  CPC ........... *B65G 13/12* (2013.01); *B65G 39/125* (2013.01)

(58) Field of Classification Search
  CPC .............................. B65G 13/12; B65G 39/125
  USPC .................................................. 198/824, 826
  See application file for complete search history.

(56) References Cited

U.S. PATENT DOCUMENTS

| | | | | |
|---|---|---|---|---|
| 3,294,218 A * | 12/1966 | Chantland | ............ | B65G 39/125 |
| | | | | 198/826 |
| 3,362,523 A * | 1/1968 | Stone | ................... | B65G 39/125 |
| | | | | 198/826 |
| 4,793,470 A * | 12/1988 | Andersson | ............. | B65G 15/62 |
| | | | | 198/841 |
| 6,349,819 B1 * | 2/2002 | Nohl | ....................... | B65G 39/12 |
| | | | | 198/830 |
| 6,367,617 B1 | 4/2002 | Schiesser | | |
| 7,950,520 B2 * | 5/2011 | Mott | ...................... | B65G 39/12 |
| | | | | 198/825 |
| 10,981,727 B1 * | 4/2021 | Guay | ..................... | B65G 15/60 |
| 2002/0063042 A1 * | 5/2002 | Fischer | ............. | B65G 21/2054 |
| | | | | 198/826 |

(Continued)

FOREIGN PATENT DOCUMENTS

CN 113816094 A 12/2021

OTHER PUBLICATIONS

Benetech, MaxZone, Drop and Slide Out Idler Assembly, Installation, Operation & Maintenance Manual, 19 pages.

(Continued)

*Primary Examiner* — James R Bidwell
(74) *Attorney, Agent, or Firm* — Loginov & Associates, PLLC; William A. Loginov

(57) ABSTRACT

This invention provides a framework that allows for tool-free removal and subsequent replacement of conveyor idlers. The opposing framework uprights, which support outboard ends of each idler, respectively, include hinged axle holders/mounts that can be selectively swung into engagement with, and out of engagement with the axle ends. In this manner, the opposing outer idlers can be disengaged from each, respective, outboard axle holder and then slid out of corresponding inboard axle holders, which each define a socket for receiving the inboard axle end. Each hinged, outboard axle holder can be secured in an engaged orientation with the corresponding axle end using a pin, or other fastener that removably interengages with a lower, fixed portion of the outboard upright, where the two members overlap. The central idler is held in place in keyed slots in central uprights. The framework can define an equal troughing, unequal troughing or channel inset troughing framework arrangement.

18 Claims, 14 Drawing Sheets

(56) References Cited

U.S. PATENT DOCUMENTS

2016/0159574 A1\* 6/2016 Gibbs .................... B65G 15/08
29/434

OTHER PUBLICATIONS

I&B Mining Services, Drop Down Retractable Idler (DDRI) Frame Assemblies, Installation Operating Maintenance Manual, 27 pages.

\* cited by examiner

FRAMEWORK WITH TOOL-FREE CHANGEOVER MOUNTINGS FOR IDLERS

FIELD OF THE INVENTION

This invention relates to frameworks used to rotatably support idlers in industrial conveyor belts.

BACKGROUND OF THE INVENTION

Conveyor systems that utilize belts are used in a wide range of industries and applications. Their length and width vary significantly, depending upon the needs of the jobsite. Conveyor systems can be either fixed in place or mobile. In general, the belt consists of a continuous, durable and flexible material—such as steel-reinforced or fiber-reinforced polymer (e.g. natural or synthetic rubber). The belt can be adapted to move tons of loose material over a given timeframe. To ensure that the belt remains generally planar along its moving surface, a series of (relatively) closely spaced idlers are provided between one or more drive pulleys. Such drive pulleys can be located at the end(s) of the belt, or another appropriate location along its length.

In certain applications—such as movement of coal, gravel ore, and other loose material, the conveyor belt is formed into a trough shape along its transverse cross section. The raised sides of the trough retain the material in place as it transits the length of the belt. This trough shape is maintained, in part by the arrangement of the underlying idlers. For example, a set of three idlers are employed, each of a similar axial length. The three idlers consist of a center idler that has a rotational axis parallel to the ground, and the two opposing side idlers, having rotational axes that are angled upwardly, in each of opposing directions to define an isosceles trapezoid.

The idlers are mounted in a supporting frame, or "framework", that secures fixed shafts thereto. The idler sleeves, which contact the belt, are free to rotate relative to the fixed shafts on bearings that are located on each of opposing sides of the sleeve(s). The material carried by the conveyor belt can often include small sand and grit, which is often highly abrasive. The idler ends and bearings are covered and/or sealed, to varying degrees, so as to resist infiltration of the sand and grit into the moving surfaces. However, eventually grit infiltrates the moving elements of the bearings causing them to fail, and the idler(s) to seize. Such seizure can cause the idler surface to abrade (and potentially destroy) the belt if the seized idler is not replaced promptly.

However, replacement of idlers can be time consuming, as the framework must be partially disassembled and/or other time-consuming steps are required to remove an old idler and replace it with a newer idler. Various tools are required to perform these disassembly and reassembly tasks. Fasteners used to construct the framework can become seized, break or be misplaced during the process. This inconvenience is exacerbated for heavier duty assemblies where the framework and idler are even more securely assembled with heavier duty hardware, requiring substantial tools.

SUMMARY OF THE INVENTION

This invention overcomes disadvantages of the prior art by providing a framework that allows for tool-free removal and subsequent replacement of conveyor idlers. The framework can be adapted to support three idlers, including a central idler and a pair of opposing, outer idlers, in a trough shape. The opposing framework uprights, which support outboard ends of each idler, respectively, include hinged axle holders or mounts that can be selectively swung into engagement with, and out of engagement with the axle ends. In this manner, the opposing outer idlers can be disengaged from each, respective, outboard axle holder and then slid out of corresponding inboard axle holders or mounts, which each define a socket for receiving the inboard axle end. Each hinged, outboard axle holder can be secured in an engaged orientation with the corresponding axle end using a pin, or other fastener that removably interengages with a lower, fixed portion of the outboard upright, where the two members overlap. The central idler is held in place in keyed slots in central uprights, in which that the central idler can be removed from the framework by lifting the opposing axle ends out of the slots, and inserted by dropping the axle ends into the slots. The slots can define non-vertical angles to resist lifting during operation. The framework can be partially or fully formed from stamped/cut sheet metal (e.g. steel plate) and stock (e.g. angle iron) components that are welded, or otherwise fastened together into an assembled arrangement. The framework can define a variety of profiles for different conveying tasks, including, but not limited to, an equal troughing framework arrangement, an unequal troughing framework arrangement and a channel inset troughing framework arrangement.

In an illustrative embodiment, a framework assembly for supporting a central idler and outer idlers in a trough arrangement is provided. The framework includes a base and outer uprights adjacent to each of opposing ends of the base. Central uprights are located remote from the opposite ends, and inner axle mounts on the central uprights each receive a respective axle end of the central idler. Outer axle mounts on the central upright each receive an inboard axle end of each of the outer idlers, respectively. A hinged axle mount on each of the outer uprights rotate into and out of engagement with an outboard axle end of each of the outer idlers, respectively. Illustratively, the hinged axle mount includes a hinge pivot assembly and a fixation structure, remote from the hinge pivot, which selectively locks the mount in engagement with the outboard axle end. Each of the outer uprights can include upright wings and the hinged axle mount includes mount wings nested within the upright wings, with the hinge pivot assembly passing between an adjacent one of the upright wings and the mount wings. The fixation structure can comprise a removable pin that passes through overlapping holes in each of the upright wings and the mount wings, and/or the removable pin can comprise a ball lock spring pin. The inner axle mounts can define slots arranged to allow the respective axle ends of the central idler to pass approximately vertically into and out of the slots. The central uprights can each define a sheet metal member with a reinforcing buttress assembly, and the inner axle mounts can be attached to a sheet metal upright having a slot with a non-vertical, angled top portion. The central uprights can each define a sheet metal member defining a folded shape with an inboard wall and outboard wall, the outboard wall can include a slot that captures an axle end of one of the outer idlers, respectively, and/or the inboard wall can define one of the slots arranged to allow the respective axle ends of the central idler to pass approximately vertically into and out of the slots. The outer axle mounts can define sockets sized and arranged to axially receive the inboard axle end of each of the outer idlers, respectively. Illustratively, the central uprights, the inner axle mounts and the outer axle mounts can collectively define a unitary metal structure secured to the base. The base, the outer uprights and the central uprights can define one of an equal troughing framework and a channel troughing framework. The base can comprise one or more angle irons. Each of outer uprights can be reinforced by an angled brace extending between the base and a respective of the uprights, and/or the brace can define one of either a cut sheet metal piece, which may be flat or formed, and an angle iron.

A method for replacing the outer idlers in the framework assembly can be provided. The hinged axle mount is rotated to disengage from the outboard axle end of at least one of the outer axle mount, respectively. At least one of the outer idlers is withdrawn from the one of the outer axle mounts, respectively. A new replacement outer idler is placed into the one of the outer axle mounts, respectively, and the hinged axle mount is rotated into an inboard axle end of the replacement outer idler to secure it in the framework. The fixation structure can be selectively removed to unlock and attaching the fixation structure to lock the hinged axle mount. At least one of the central uprights and the outer uprights can be formed by cutting and folding sheet metal plate. The outer uprights and the central uprights can be attached to predetermined locations on one or more angle irons that define the base by welding.

BRIEF DESCRIPTION OF THE DRAWINGS

The invention description below refers to the accompanying drawings, of which.

DETAILED DESCRIPTION

Figure 1:
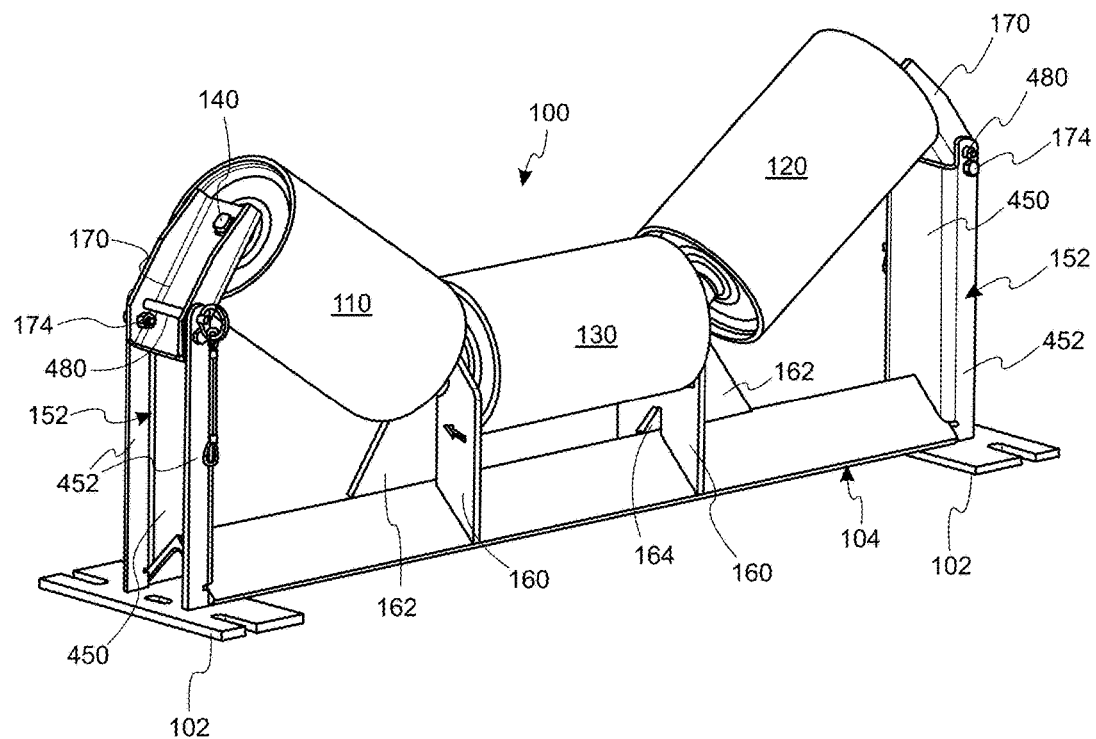
FIG. 1 is a perspective view an equal troughing framework for tool-free attachment and removal of idlers, in which all frame components are constructed from cut sheet metal (e.g. steel plate) and stock (e.g. angle iron), shown with the opposing outboard idlers and central idler installed and engaged by the axle holders, according to an illustrative embodiment.
Figure 2:
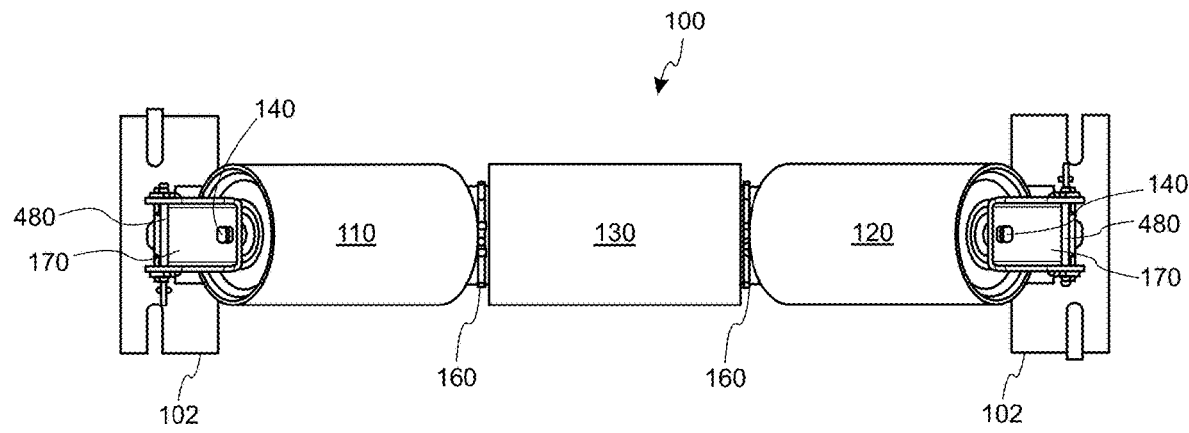
FIG. 2 is a top view of the framework of FIG. 1.
Figure 3:
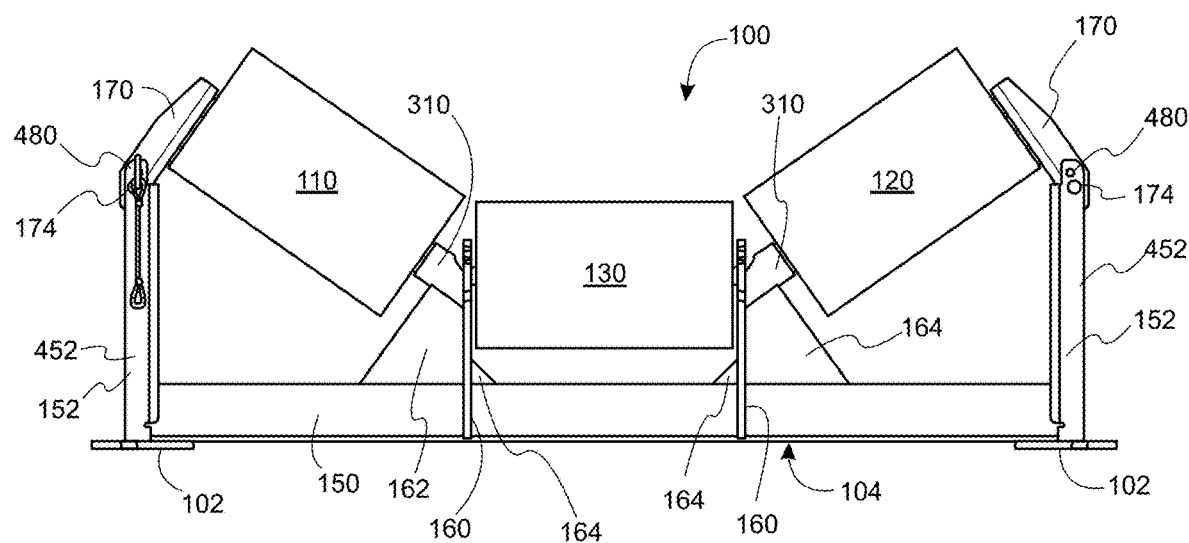
FIG. 3 is front view of the framework of FIG. 1.

Reference is made to FIGS. 1-4, which show an idler-holding framework assembly 100 in an equal troughing arrangement, according to an embodiment. This framework assembly 100 is arranged to support the belt of a conveyor system in a trough shape, in which a series of spaced-apart assemblies are disposed along a path, with bases 102 secured to an underlying support structure (not shown).

The framework assembly 100 is constructed from sheet metal (e.g. steel plate) components and stock (e.g. angle iron) so as to define an overall framework, which supports two outer idlers 110 and 120, and a central idler 130, which collectively form a trough, with a vertically depressed center and upwardly angled sides. The angle of the trough sides is highly variable and can define a range of angles within the general profile as depicted herein. Each idler 110, 120 and 130 typically consists of a cylindrical sleeve that can be constructed from metal, such as seamless steel tubing of an appropriate alloy, or a polymer, and a pair of opposing, idler ends that form caps for each end of the sleeve. Each opposing idler end includes a respective axle 140 constructed from an appropriately durable metal (e.g. steel alloy) of acceptable composition and hardness. Each axle 140 includes a pair of opposing flats 442 (FIG. 4) and/or other shapes to facilitate rotational and lateral fixation in a conforming, slotted hole in a corresponding upright of the framework 104. As described below, each idler 110, 120 and 130 is removably mounted in the framework 104. By way of non-limiting background, an example of such and idler and framework structure is shown and described in commonly assigned U.S. Pat. No. 10,981,727, entitled CONVEYOR IDLER AND SUPPORT STRUCTURE AND METHODS FOR CONSTRUCTING THE SAME, issued Apr. 20, 2021, the teachings of which are incorporated herein by reference.

Figure 4:
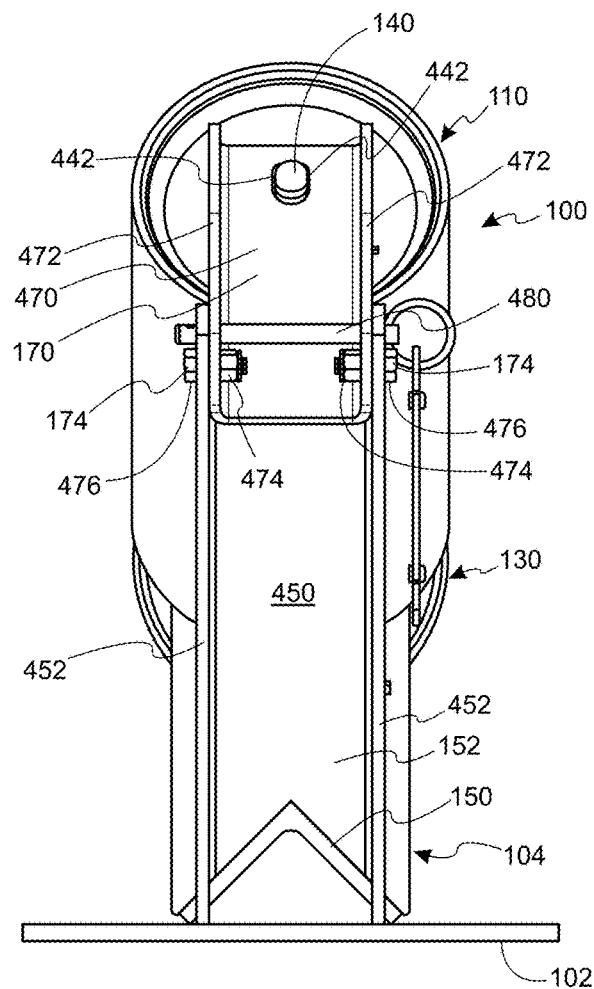
FIG. 4 is a side view of the framework of FIG. 1.
Figure 8:
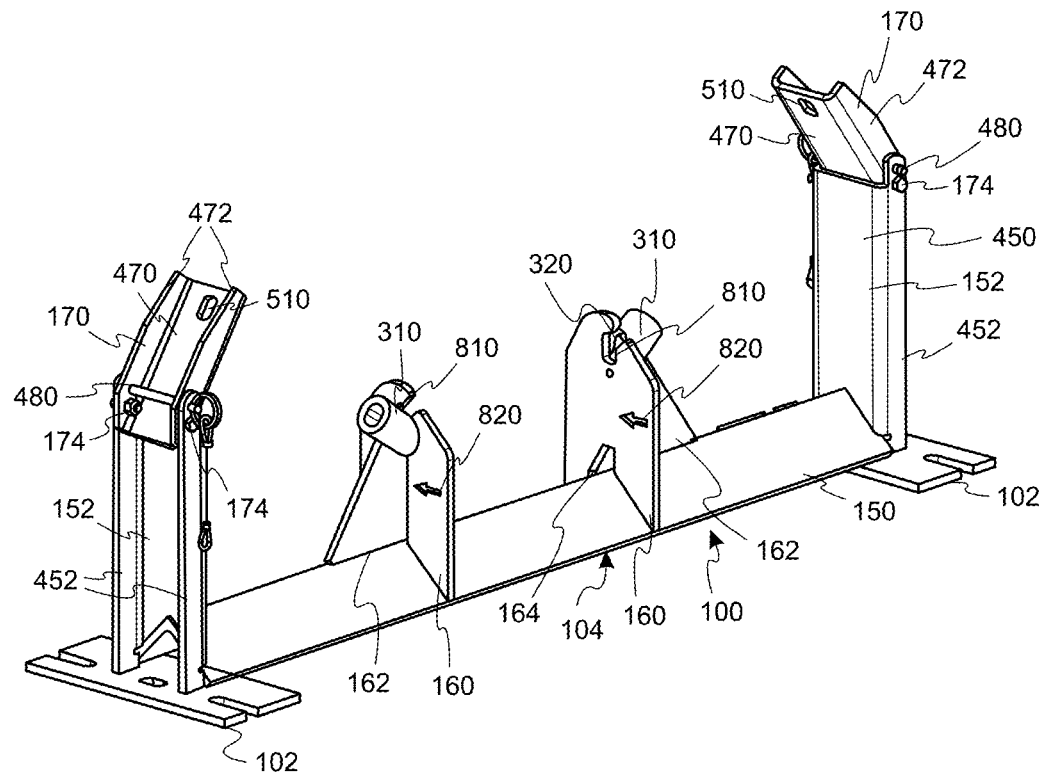
FIG. 8 is a perspective view the framework of FIG. 1, showing the outboard axle holders in an engaged orientation and the idlers removed therefrom.

The framework 104 consists of a base member 150 that extends the width of the assembly. The base member 150 can define a right-angle-cross section metal beam with the apex vertically centered at the top. An outer upright 152 is secured (e.g. by welding) to each opposing end of the base member 150. As shown, each outer upright 152 can define a channel with a flat web 450 and pair of opposing wings 452 (FIG. 4). This structure provides rigidity to each outer upright 152. A pair of inner (central) uprights 160, vertically lower in height than the outer uprights 152. The central uprights 160 define flat member that are supported laterally by outer buttresses 162 and, smaller, inner buttresses 164, by way of non-limiting example. The buttresses can be part of a unitary, cut (generally triangular) piece having a slot at the (top) apex that is inserted into a mating slot in the bottom of each upright 160. As shown clearly in FIG. 3, each central upright includes a cast and/or machined axle mount 310 adapted to (axially) receive the inboard axle end of each outer idler 110 and 120. The mounts 310 are formed with flats to conform the flats (442) on the axle ends, and are also notched (320) where they meet the uprights 160 to receive the respective axle ends of the central idler 130, as described further below (see FIG. 8). The mounts 310 can be welded to both the uprights 160 and outer buttresses, in the depicted, upwardly angled orientation in each opposing direction, as shown. The confronting, notched ends of each mount 310 are appropriately angled to abut the upright 160. Note that the particular structure of the central uprights 160 and supporting components 162 and 164 is highly variable in alternate embodiments (as described further below with reference to the alternate embodiment of FIG. 9). In an embodiment, and by way of non-limiting example, the various sheet metal components can be constructed for sheet steel alloy such as ASTM A1011 HRPO, with a thickness of between 0.125 inch and 0.375 inch. However, in alternate embodiments, depending upon the weight limits, stress, and other application-specific requirements, the materials employed, and/or thickness of such materials can be varied in a manner clear to those of skill.

Notably, the outer axle ends 140 of each outer idler 110 and 120 are supported by hinged axle mounts 170. The mounts 170 define a central web 470 and reinforcing wings 472 (FIG. 4). As shown, the mount 170 nests within the wings 452 of the outer upright 152. Each hinged mount 170 is rotatably secured to the respective upright 152 by a fastener assembly 174 that passes through a hole in each upright wing 452 and confronting mount wing 472. By way of non-limiting example, each fastener 174 can comprise a bolt 476 and mating nut 474 (FIG. 4). The nut 474 can comprising a locking nut (e.g. a Nylok®-style nut, castle nut with cotter pin, etc.) in various embodiments. The fastener 174 defines the pivot for the hinged mount 170. The hinged mount 170 can be selectively locked into engagement with each axle end 140 (as shown FIGS. 1-4) using a fixation pin 480 that crosses through corresponding holed in the upright wings 452 and mount wings 472 as shown. The pin can be any acceptable, typically hardened structure, including a commercially available ball lock spring pin, as shown. More generally, and cross pin, or similar fastener, that retains the rotational position between the upright and hinged mount can be employed-including, but not limited to cottered pins, plunger pins, bolts and nuts, etc. In alternate embodiments, two separate fixation structures/pins can engage each overlapping set of wings 452, 472. The diameter/material of the pin 480 can be varied. For example, depending upon the conveyor size diameter can be between approximately ¼ and ½ inch. Hardened or mild steel alloy can be used in pin construction.

Figure 5:
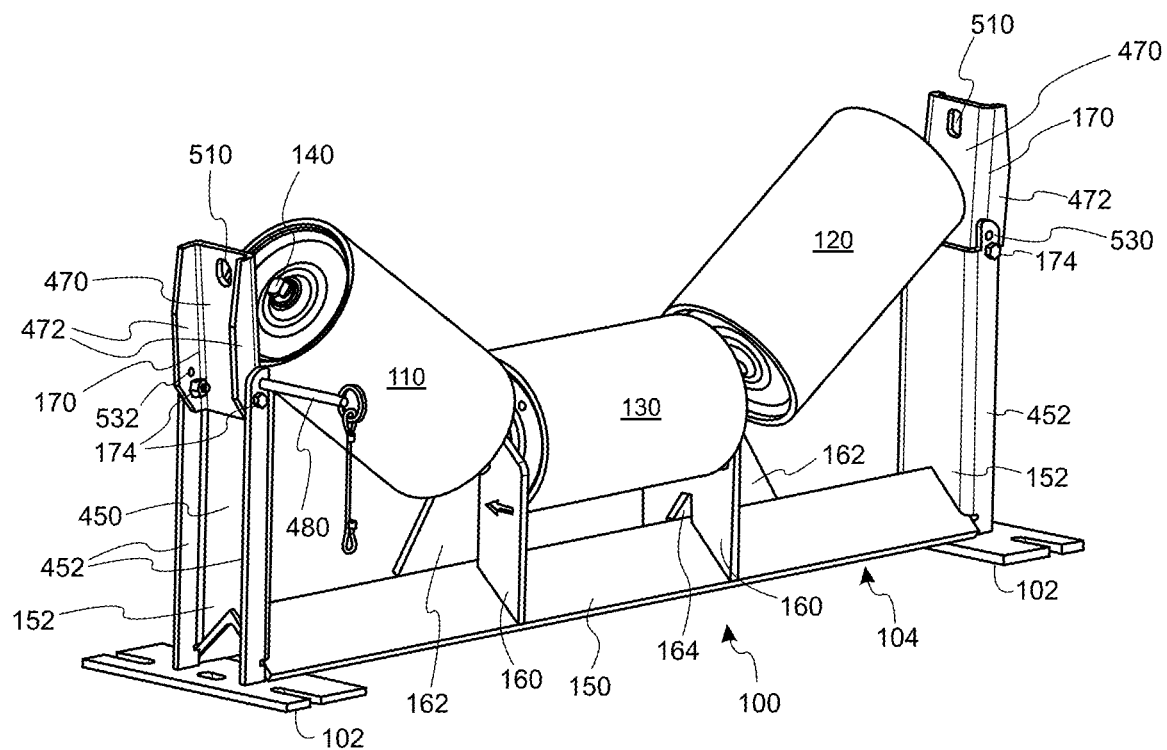
FIG. 5 is another perspective view of the framework of FIG. 1, showing the outboard axle holders disengaged from the idler axle ends.
Figure 6:
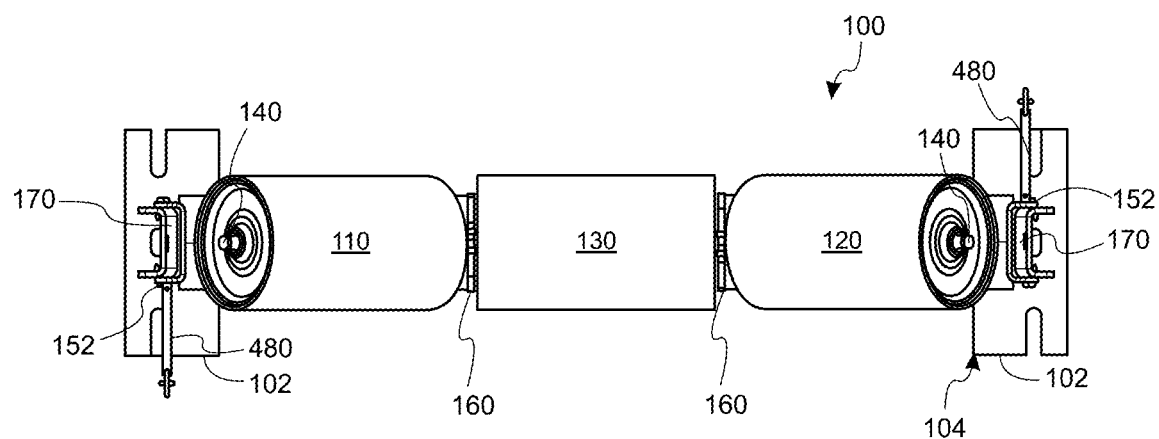
FIG. 6 is a top view of the framework of FIG. 1, showing the outboard axle holders in disengaged orientation, according to FIG. 5.
Figure 7:
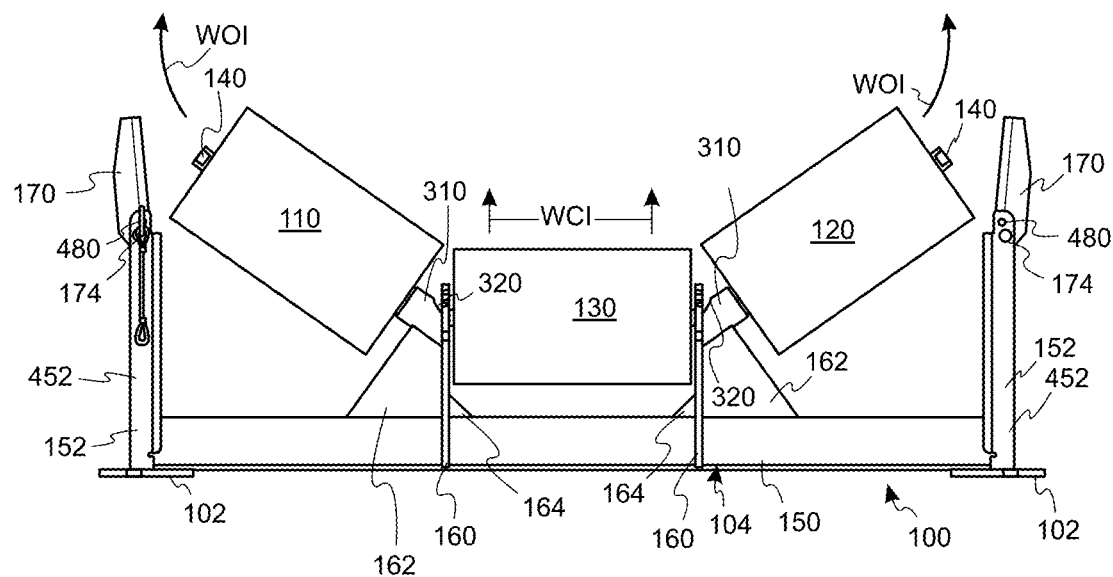
FIG. 7 is a front view of the framework of FIG. 1, showing the outboard axle holders in disengaged orientation, according to FIG. 5.

With further reference to FIGS. 5-7, the fixation pins 480 have been pulled outwardly so that the mounts 170 a pivoted away from their confronting idler axle ends 140, thereby withdrawing each mount's keyed hole 510 therefrom. As shown, the pin 480 thereby clears the respective pin holes 530 and 532 for the upright 152 and mount 170, and is free of interference therewith. In this manner, the disengaged (pivoted) mount no longer captures the outer idler 110, 120, and it can be withdrawn from the assembly 100 by axially pulling it away from the central mount 310, and lifting upwardly on the opposing (outboard) end (upwardly curved arrows WOI in FIG. 7).

The central idler 130 is withdrawn from the assembly 100 by lifting (arrows WCI) the axle ends out of the notches 320 in the mounts 310 via slots 810 in the tops of the central uprights 160. Note that the shots 810 define a width that conforms to the spacing of the axle end flats 442. In this embodiment, the upper portions of the slots 810 are angled as shown. In this manner, upward climb of the central idler 130 is resisted during operation as the angled slot applies a resisting bias to direct upward movement of the axle end. Optionally, each upright 160 includes a stamped, printed or otherwise applied (e.g.) arrow indicia 820 that directs the user on the direction to which approach the assembly 100 for withdrawal and insertion of the central idler 130. Each slot 810 is angled so that the corresponding axle end slides inwardly (toward the frame's longitudinal centerline represented by the apex of the base 150) in the direction of the arrow 820. Hence, each slot defines a "dogleg" shape, with a vertical portion at the bottom to seat each axle end.

Figure 9:
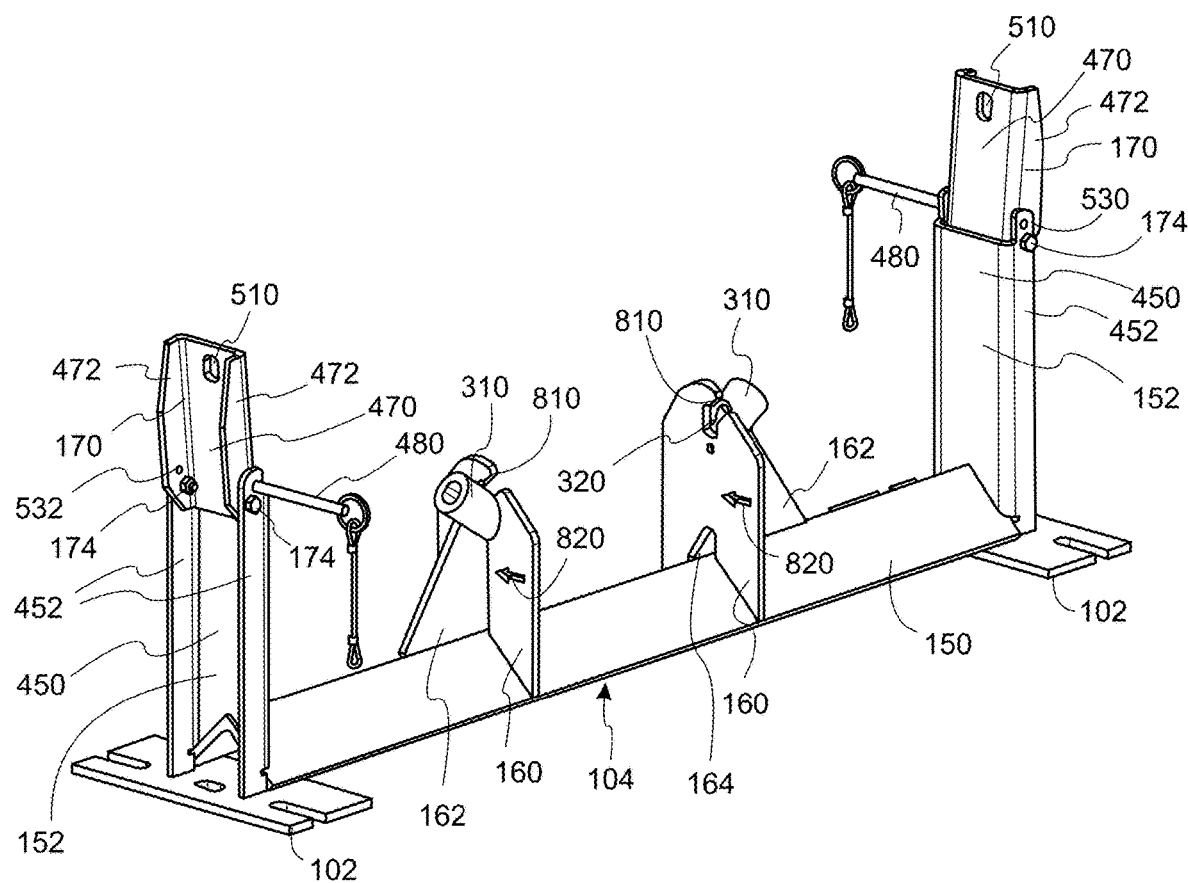
FIG. 9 is a perspective view the framework of FIG. 1, showing the outboard axle holders in a disengaged orientation and the idlers removed therefrom.

As shown in FIG. 9, the idlers 110, 120 and 130 have been removed from the frame. Replacement entails, sliding the axle ends of a new central idler (130) into the central mount slots 810, inserting the inboard axle ends of the outer idlers axially into the keyed sockets of each central mount 310, and then capturing each outboard axle end with the keyed hole 510 of the hinged outer upright mount 170. The engaged mount is then locked in place by inserting the fixation pin 480 across each of the overlapping holes 530, 532 in the nested wings 452, 472.

Figure 10:
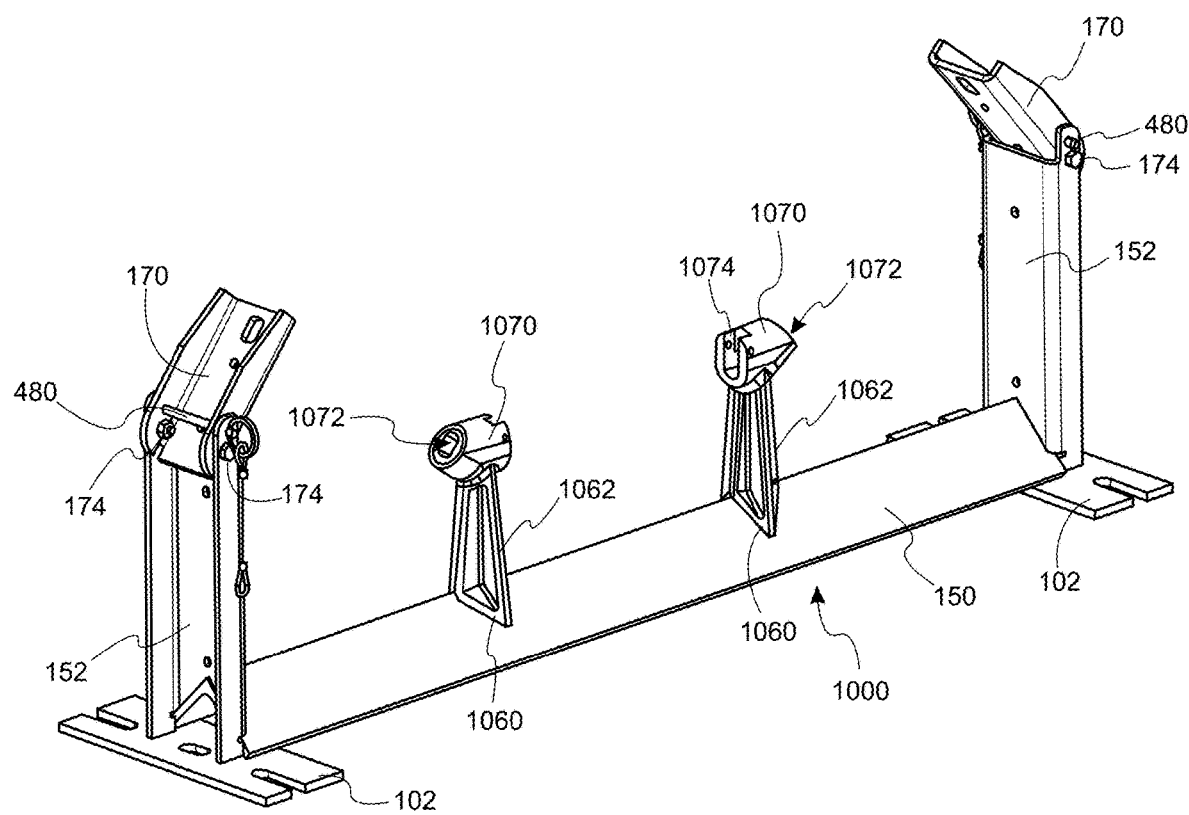
FIG. 10 is a perspective view an equal troughing framework for tool-free attachment and removal of idlers, in which the central uprights are cast metal components, shown with idlers removed, according to an alternate embodiment.

As described above, the central uprights can be construct in a variety of ways with various supporting structures. FIG. 10 shows an equal troughing idler framework assembly 1000 according to an alternate embodiment, in which the central uprights 1060 are constructed as a molded and/or casted (and optionally machined) metal structure. Components of the assembly 1000 that are otherwise the same or similar to those described above (FIGS. 1-9) are referred to by identical reference numbers. The central uprights are welded or otherwise fastened to the right-angle base/beam 150 at a spacing appropriate to accommodate the three idlers 110, 120 and 130 described above (not shown in FIG. 10). The structure/geometry of the uprights is highly variable, and in this example defines an open framework 1062 with a pyramidal structure that provides lateral support and resists bending. The exact size and shape of the uprights 1060 depends upon expected loading and the material employed, in a manner clear to those of skill. The top of each central upright 1060 includes a unitarily formed axle mount 1070. Each mount 1070 includes an upwardly and outwardly angled socket 1072 for receiving the keyed inboard axle end 140 for each outer idler 110, 120. The mount 1070 also includes an opposing slot 1074 (which face each other) adapted to receive each of the keyed axle ends of the central idler 130. In an embodiment, the uprights 1060 can be constructed from 4130 steel alloy. Overall, attachment and removal of the idlers 110, 120 and 130 can occur similarly to the above-described embodiment except that the central idler is inserted directly downwardly into the upright slots 1074, and retained therein by gravity and weight. In various embodiments, additional locking structures, which should be clear to those of skill, can be employed to assist in removably retaining the axle ends of the central idler in the slots 1074.

Figure 10A:
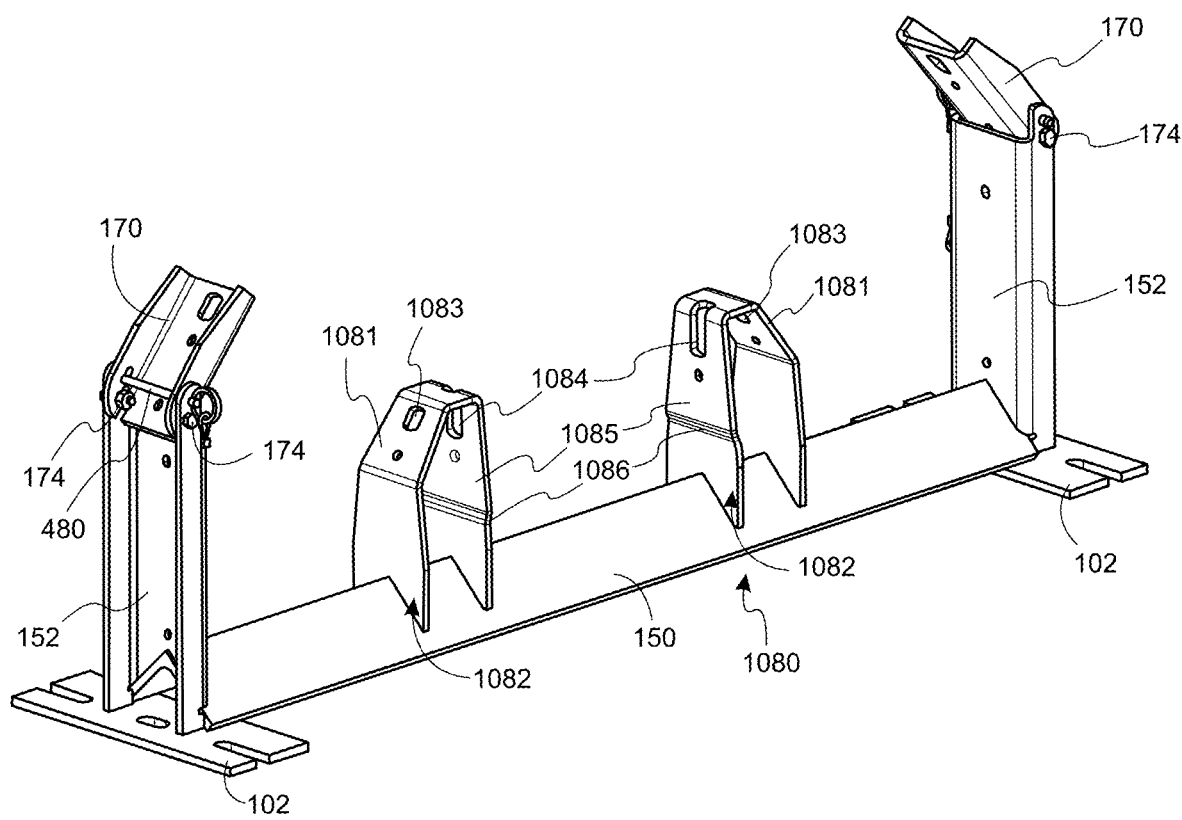
FIG. 10A is a perspective view an equal troughing framework for tool-free attachment and removal of idlers, in which the central uprights are folded sheet metal components, shown with idlers removed, according to an alternate embodiment.

The above-described framework arrangement(s) can be constructed in various manners and/or differing sizes. By way of non-limiting example, FIG. 10A shows a similar framework 1080, where like components are numbered with like reference numerals (and operate similarly—i.e. the hinged axle mounts 170). The central uprights 1082 in this embodiment define a pair of folded, cut sheet metal structures with angled outer tops 1081 and associated slots 1083 for receiving the outboard axle ends of the outer idlers. The central uprights 1082 are welded or otherwise secured to the base 150. The opposing axle ends of the central idler are each downwardly secured in a respective slot 1084 on an inboard (vertical) side 1085 of the upright 1082. Each side 1085 is slightly inset at a fold that provides needed clearance for the slot 1084 and further reinforces the structure. Note that additional folds, dimples, and/or other reinforcing formations, can be provided, as appropriate, to any of the sheet metal components.

Figure 10B:
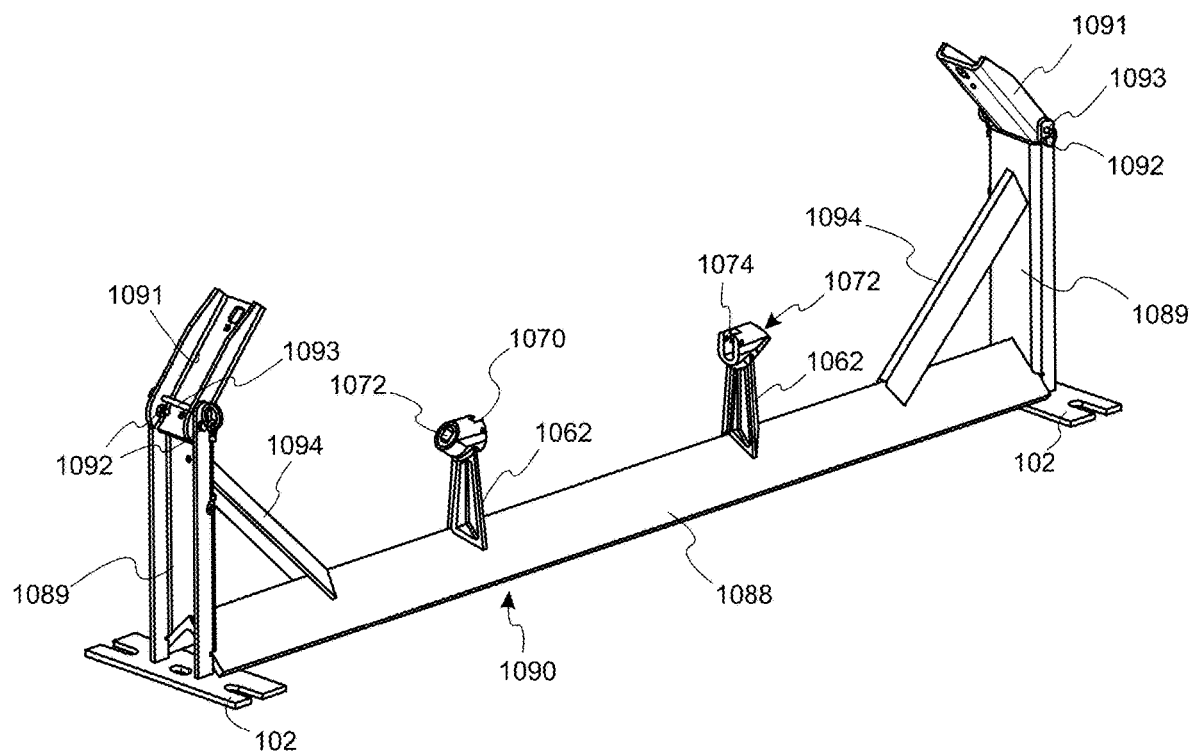
FIG. 10B is a perspective view an equal troughing framework for tool-free attachment and removal of idlers, in which the central uprights are cast metal components, shown with idlers removed, and including reinforcing braces on each of the outboard axle holders for enhanced load-handling, according to an alternate embodiment.

FIG. 10B shows another framework 1090 constructed from sheet metal, angle iron and cast components. The framework 1090 is adapted for larger and/or heavier load applications. The cast inner uprights 1062 are similar in structure and attachment (to the angle iron base 1088) as those of FIG. 10. The outer uprights 1089 are taller (accommodating longer outer idlers), and mounted similarly to the base 1088 as those described above. The upper end of each upright includes and appropriate sized axle holder 1091, the each pivots on bolt assemblies 1092 (or other appropriate hinge structure). A locking pin 1093 removably secures each axle holder 1091 in a manner described above. To enhance the strength of the taller uprights 1089, corresponding angled braces (formed sheet steel, e.g. from angle irons or similar beam structures) 1094 that are secured between a location inboard of each end of the base 1088 and a location below the hinge pivot(s) 1092 on the upright 1089. The braces 1094 can be secured by welding and or other techniques clear to those of skill in the art. The outer upright braces 1094 of this framework 1090, and others described herein, are located so as to avoid interference with the outer idlers when mounted.

Reference is now made to FIGS. 11-14, which show a channel inset troughing framework assembly 1100 according to an illustrative embodiment. The tool-free idler assembly and disassembly procedures employed by this arrangement are generally similar to those described in the above embodiments (FIGS. 1-10). The framework 1104 supports a pair of outer, upwardly/outwardly angled idlers 1110 and 1120, and a central idler 1130 defining a trough with the general geometry described above. The framework 1104 includes a bottom that comprises a pair of angle beams 1151 arranged in parallel to define a channel in which the idlers 1110, 1120 and 1130 reside (note particularly, the central idler 1130, which is depressed into the channel). Each angle beam 1151 defines an apex centered at its top. The beams 1151 extend between opposing ends that each define uprights 1152. The uprights elevate the outboard ends of each outer idler 1110, 1120 into the trough configuration. They each define an inwardly folded pair of wings 1153 that support nested, hinged mounts 1170 for engaging confronting idler axle ends 1140. The hinged mounts 1170 are rotatably secured by fasteners 1172 that can comprise nuts and bolts, or other arrangements, as described above. The fasteners pass 1172 through corresponding wings 1474 on the mount 1170. A fixation pin 1480 retains the mounts in an engaged position with respect to the outboard axle ends 1140. In a manner described above (FIGS. 1-10), the pin 1480 selectively passes through overlapping holes in each set of wings 1153 and 1474 to rotationally fix the mount 1170. The pin 1480 can be any acceptable, removable fixation device, which selectively interferes with rotation of the mount, as described generally above.

The framework 1104 includes central uprights 1160, which are lower in height than the outer uprights 1152. Note that both sets of uprights 1152, 1160 can be secured to the base 1150 and associated beams 1151 by welding, and/or other permanent or semi-permanent attachment techniques, which should be clear to those of skill. In this manner a rigid and integral framework structure is achieved. The central uprights 1160 is reinforced by buttresses 1162 on each outboard side. While not shown, smaller inboard buttresses can also be employed. Like the buttresses 162 and 164, described above, the buttresses 1162 are arranged vertically along the longitudinal center line of the framework 1104, and are welded to the upright 1160 and other adjacent frame members to provide further rigidity. The buttresses 1162 and uprights are attached (e.g. by welding, etc.) to angled mounts 1310 (FIG. 13) with notches for receiving axle ends of the central idler 1130 and defines sockets for receiving the inboard axle ends of the outer idlers 1120 and 1120. Note that the central mounts 1310 can be similar or identical in construction and materials to the mounts 310 of the framework assembly 100 of FIGS. 1-9.

With further reference to FIGS. 15-18, the outer upright mounts 1170 are shown rotated away from the outboard axle ends 1140 of the outer idlers 1110 and 1120. Hence the axle ends 1140 are free of the capturing holes 1510 in the mounts 1170. This allows the outer idler inboard axle ends to be withdrawn axially from the sockets of respective central mounts 1310, and rotated upwardly (curved arrows WOI1 in FIG. 13) to lift the idlers 1110 and 1120 out of assembly 1100. Likewise, the central idler 1130 can be withdrawn by lifting (arrows WIC1) its axle ends out of the corresponding slots in the central mounts 1310. Attachment of new outer and central idlers is the reverse of disassembly, in that the new idlers are inserted so that confronting axle ends 1140 engage the opposing sides of the central mount 1310, and then the outboard axle ends 1140 for the outer idlers become captured by the key holes 1510 of the confronting mounts 1170, when such are rotated into engagement. Pins 1480 then lock the mounts in the engaged position by reinserting them through the wings 1153, 1474 of the nested mount arrangement.

In general, the types/sizes of idlers employed by the framework assembly 1100, as well as the materials and relative thicknesses for the assembly 1100 can be similar to those of the framework assemblies 100 and 1000 of FIGS. 1-10. It is also contemplated that, in the addition to the depicted reinforcing buttresses and other structures provided, further reinforcing brackets, gussets, and the like, can be applied (e.g. by welding, fasteners, etc.) to various portions of the frameworks herein to enhance durability and load-handling, in a manner clear to those of skill. The various sheet metal plate components can be constructed from a variety of techniques using pre-formed members or cut and folded pieces in a manner clear to those of skill. Cutting can be accomplished using any acceptable mechanism, including die stamping, laser cutting, water cutting, etc. More generally, in an illustrative embodiment, and by way of non-limiting example, the framework(s) herein can employ laser-cut steel plates and sheet, which is then formed, as well as machined, in addition to cast components, as well as angle iron(s).

Figure 11:
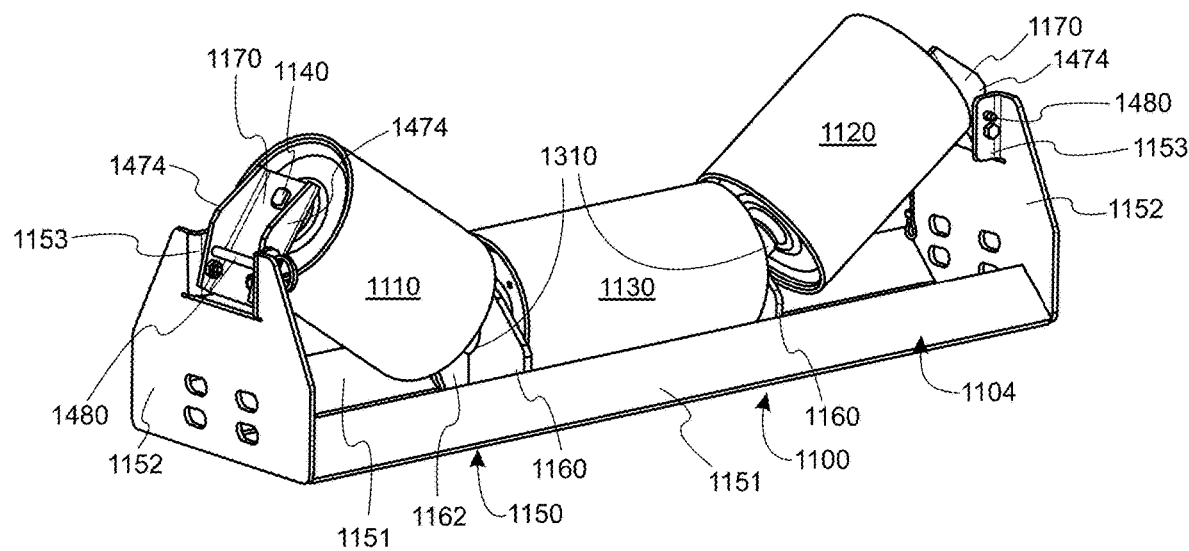
FIG. 11 is a perspective view a channel inset troughing framework for tool-free attachment and removal of idlers, shown with the opposing outboard idlers and central idlers installed and engaged by the axle holders, according to an illustrative embodiment.
Figure 12:
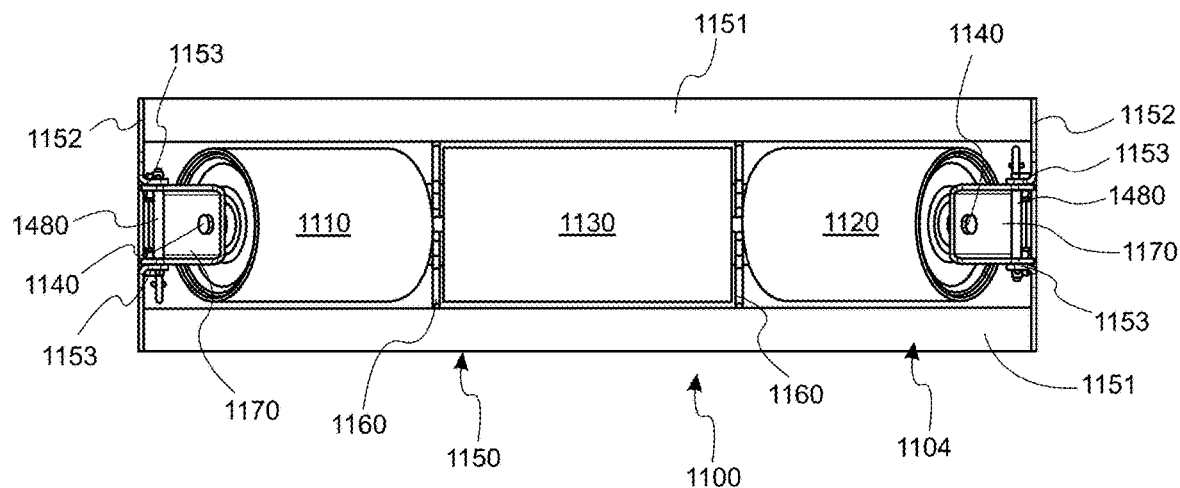
FIG. 12 is a top view of the framework of FIG. 11.
Figure 13:
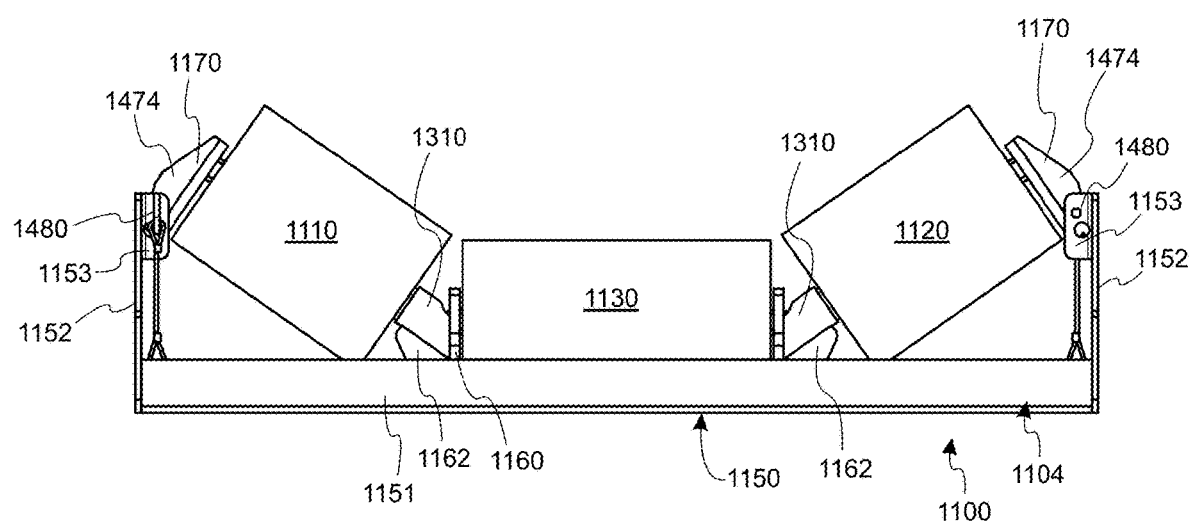
FIG. 13 is a front view of the framework of FIG. 11.
Figure 14:
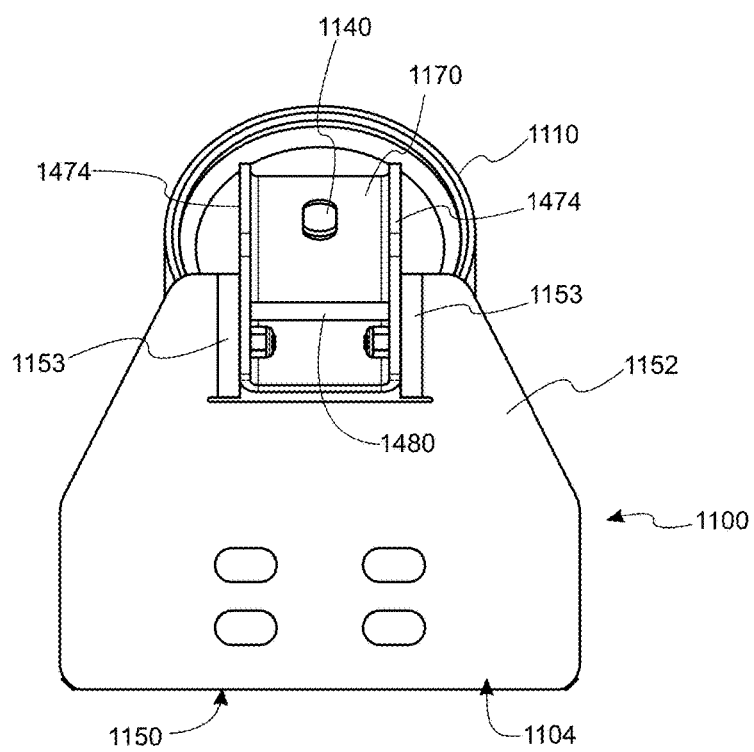
FIG. 14 is a side view of the framework of FIG. 11.
Figure 15:
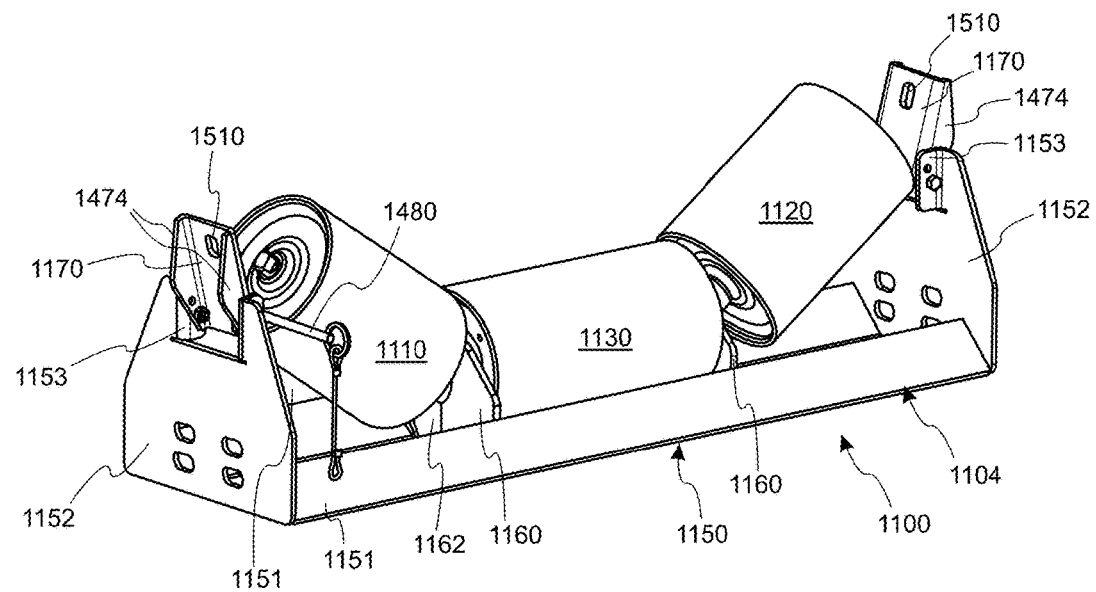
FIG. 15 is another perspective view of the framework of FIG. 11, showing the outboard axle holders disengaged from the idler axle ends.
Figure 16:
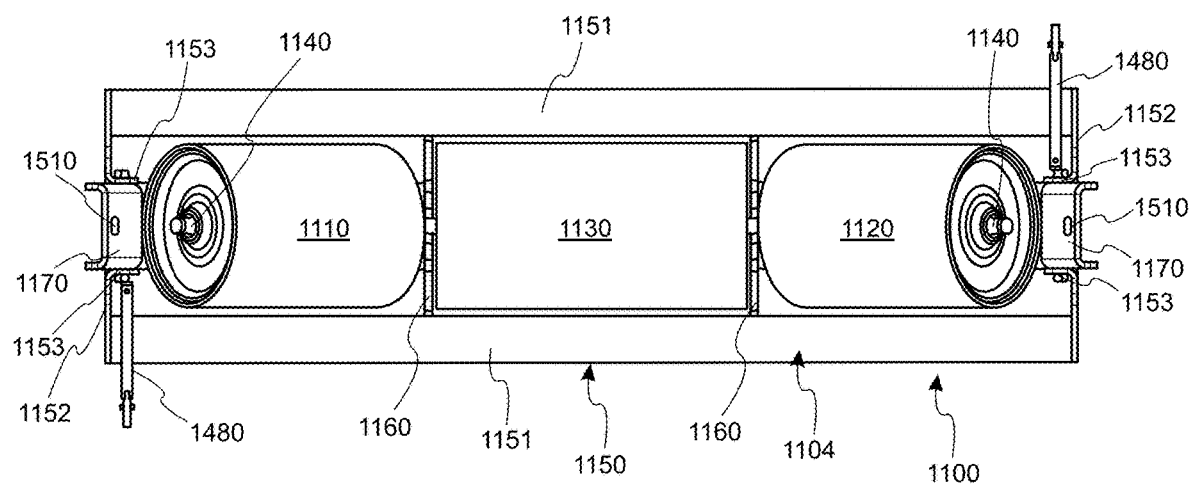
FIG. 16 is a top view of the framework of FIG. 11, showing the outboard axle holders in disengaged orientation, according to FIG. 15.
Figure 17:
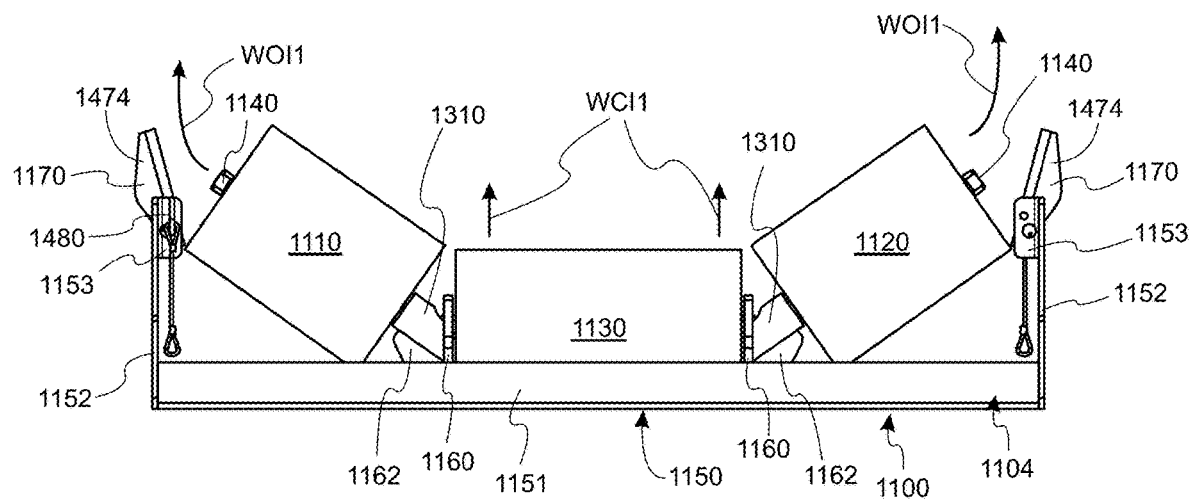
FIG. 17 is a front view of the framework of FIG. 11, showing the outboard axle holders in disengaged orientation, according to FIG. 15.
Figure 18:
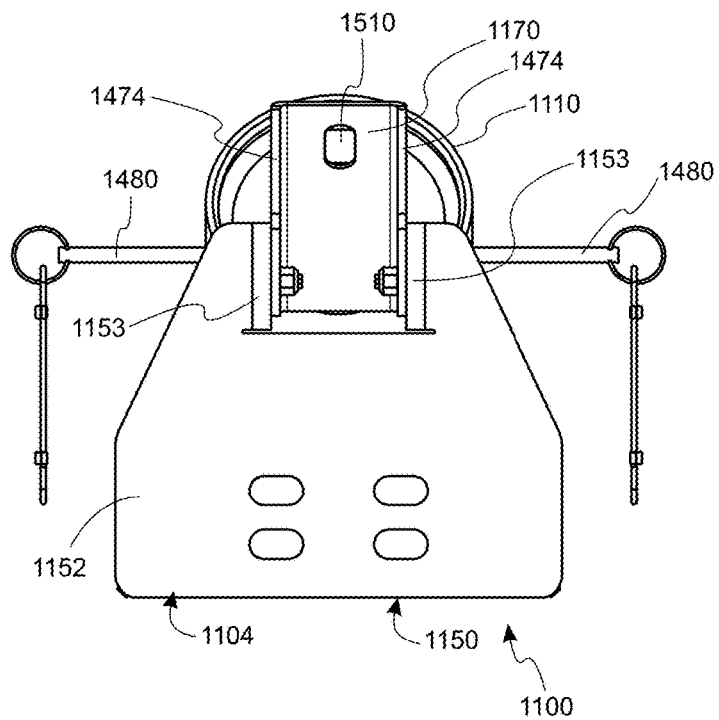
FIG. 18 is a front view of the framework of FIG. 11, showing the outboard axle holders in disengaged orientation, according to FIG. 15.
Figure 19:
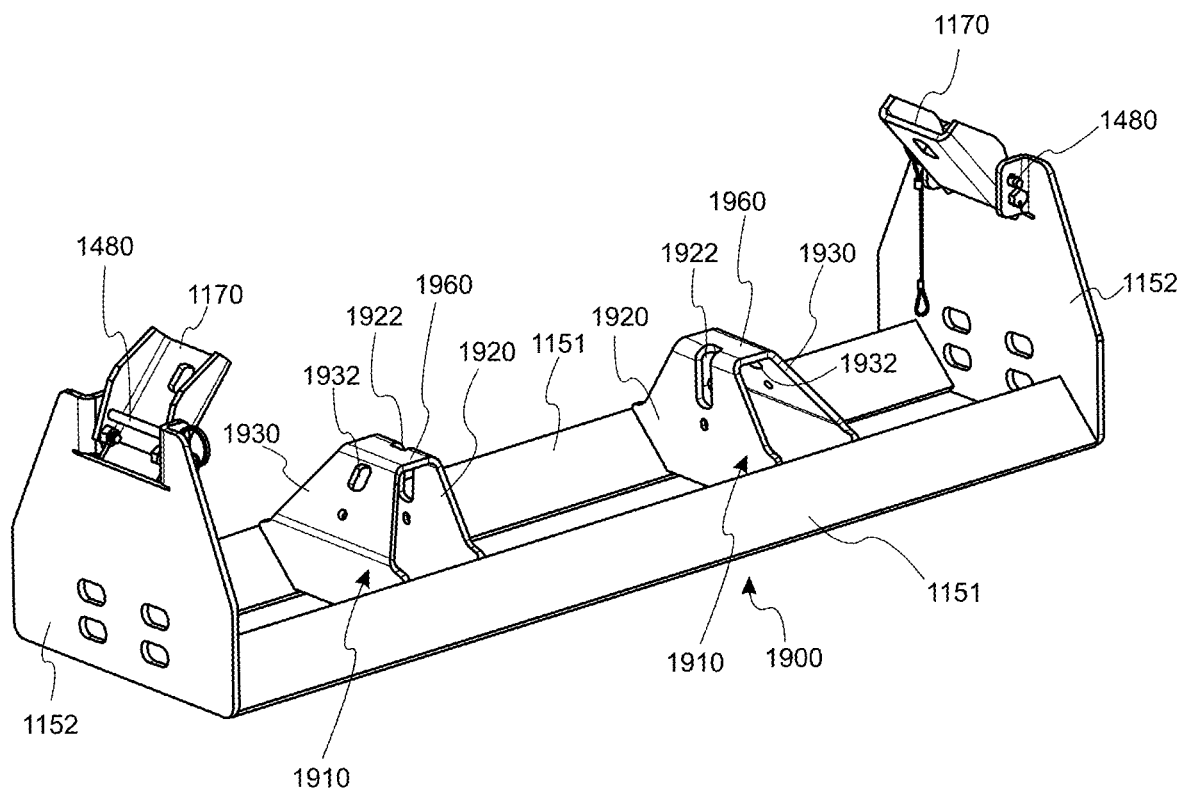
FIG. 19 is a perspective view a channel inset troughing framework for tool-free attachment and removal of idlers, in which the central uprights are folded sheet metal components, shown with idlers removed, according to an alternate embodiment.

FIG. 19 shows a channel inset troughing framework assembly 1900 according to an alternate embodiment. Like components to those of the embodiment of FIG. 11 are provided with like reference numbers. The central uprights 1910 are cut and folded sheet metal structures that are secured to the (e.g. angle iron) base members 1151 by welding or another appropriate securing technique. The uprights define vertical inboard walls 1920 with inboard slots 1922 for receiving the axle ends of the central idler (not shown). The outbound walls 1930 are angled, and include outboard slots 1932 to conform to the trough angle of the outer idlers. The precise shape and fold pattern for the uprights 1910 is highly variable. In this example, the inboard walls 1920 and outboard walls 1930 are separated by a rectangular top section 1960 that includes a notch allowing clearance for passage of the confronting axle end of the central idler into the slot 1922.

Figure 20:
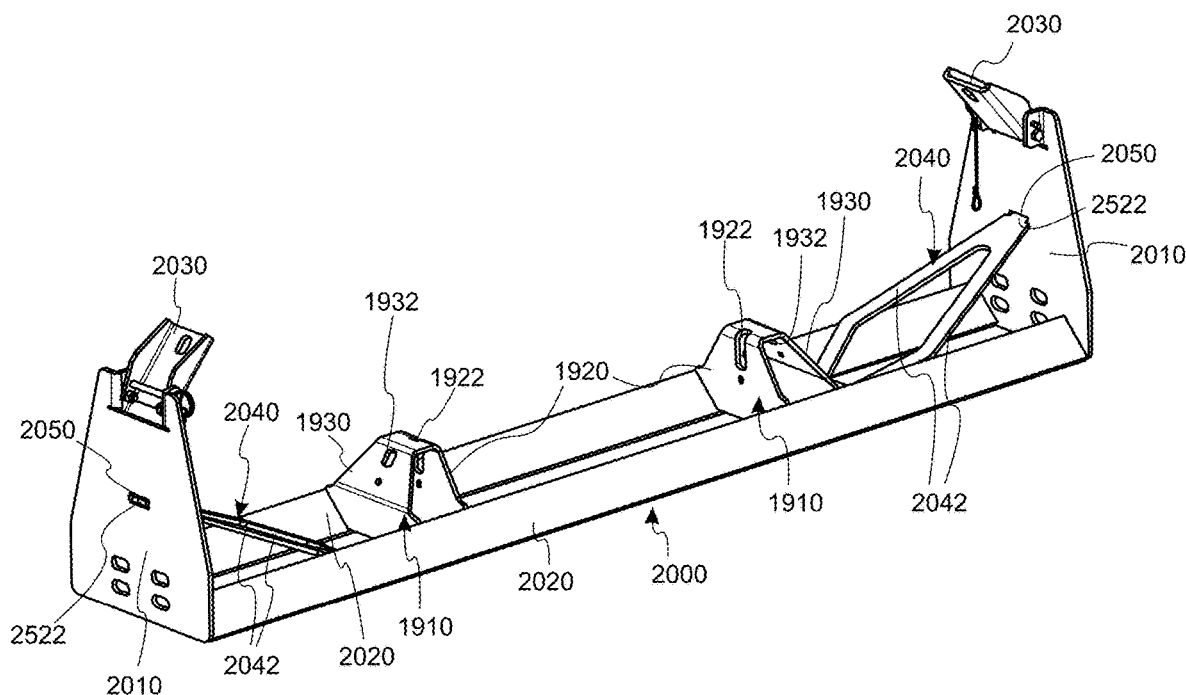
FIG. 20 is a perspective view a channel inset troughing framework for tool-free attachment and removal of idlers, in which the central uprights are folded sheet metal components as shown generally in FIG. 19, and including reinforcing braces on each of the outboard axle holders for enhanced load-handling in larger and/or heavier-duty conveyor arrangements, according to an alternate embodiment.

FIG. 20, shows another channel inset troughing framework assembly 2000, adapted to accommodate heavier and/or larger loads, according to an alternate embodiment. The general structure and function of the framework 2000 is similar to that of FIGS. 11-19, and the central uprights 1910 are similar to those of FIG. 19 and similarly numbered. The central uprights 1910 and outer uprights 2010 are attached (e.g. by welding, etc.) to the base, which consists of two parallel angle irons 2020 of appropriate length. The central uprights 1910 are spaced-apart so as to receive the axle ends of inner and outer idler(s) of predetermined length and diameter. The outer uprights 2010 are constructed similarly to those of FIGS. 11-19, but are taller to accommodate longer outer idlers. The outer idlers (not shown) are removably secured using hinged outer axle holders 2030 that operate as described generally herein.

The outer uprights are each reinforced by an angled brace 2040 that extends between the base members 2020. The shape and size of the brace 2040 is highly variable. In this exemplary embodiment, it consists of a pair of legs that define a diamond shape, extending between a location of the base members 2020 and a location on each outer upright. The brace can be constructed from cut sheet metal plate of appropriate thickness, and can be secured to the framework by welding. In this example, each outer upright 2010 includes a slot 2050 that receives a conforming tab 2052 on the brace 2040, thereby strengthening the overall connection and easing assembly. The braces 2040 are each located to avoid interference with the outer idlers when mounted.

It should also be clear that the above-described idler framework assemblies provide a robust and readily serviceable construction for supporting a moving conveyor in a trough configuration. The assemblies herein allow for more straightforward removal and replacement of both outer and central idlers with a minimum of tools, leading to reduced labor costs and less conveyor downtime.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of mechanical, electro-mechanical, electronic hardware and/or software based functions and components. Moreover, a depicted process or processor can be combined with other processes and/or processors or divided into various sub-processes or processors. Such sub-processes and/or sub-processors can be variously combined according to embodiments herein. Accordingly, this description is meant to be taken only by way of example, and not to otherwise limit the scope of this invention.

What is claimed is:

1. A framework assembly for supporting a central idler and outer idlers in a trough arrangement comprising:
a base and outer uprights adjacent to each of opposing ends of the base;
central uprights remote from the opposite ends;
inner axle mounts on the central uprights that each receive a respective axle end of the central idler;
outer axle mounts on the central upright that each receive an inboard axle end of each of the outer idlers, respectively; and
a hinged axle mount on each of the outer uprights that rotate into and out of engagement with an outboard axle end of each of the outer idlers, respectively,
wherein the hinged axle mount includes a hinge pivot assembly and a fixation structure, remote from the hinge pivot, that selectively locks the mount in engagement with the outboard axle end.

2. The framework assembly as set forth in claim 1 wherein the base, the outer uprights and the central uprights define one of an equal troughing framework and a channel troughing framework.

3. The framework assembly as set forth in claim 1 wherein each of the outer uprights includes upright wings and the hinged axle mount includes mount wings nested within the upright wings, with the hinge pivot assembly passing between an adjacent one of the upright wings and the mount wings.

4. The framework assembly as set forth in claim 3 wherein the fixation structure comprises a removable pin that passes through overlapping holes in each of the upright wings and the mount wings.

5. The framework assembly as set forth in claim 4 wherein the removable pin comprises a ball lock spring pin.

6. The framework assembly as set forth in claim 1 wherein the base comprises one or more angle irons.

7. The framework assembly as set forth in claim 6 wherein the brace defines one of a cut sheet metal piece and an angle iron.

8. The framework assembly as set forth in claim 1 wherein each of outer uprights is reinforced by an angled brace extending between the base and a respective of the uprights.

9. A framework assembly for supporting a central idler and outer idlers in a trough arrangement comprising:
   a base and outer uprights adjacent to each of opposing ends of the base;
   central uprights remote from the opposite ends;
   inner axle mounts on the central uprights that each receive a respective axle end of the central idler;
   outer axle mounts on the central upright that each receive an inboard axle end of each of the outer idlers, respectively; and
   a hinged axle mount on each of the outer uprights that rotate into and out of engagement with an outboard axle end of each of the outer idlers, respectively,
   wherein the inner axle mounts define slots arranged to allow the respective axle ends of the central idler to pass approximately vertically into and out of the slots.

10. The framework assembly as set forth in claim 9 wherein the hinged axle mount includes a hinge pivot assembly and a fixation structure, remote from the hinge pivot, that selectively locks the mount in engagement with the outboard axle end.

11. The framework assembly as set forth in claim 9 wherein the central uprights each define a sheet metal member with a reinforcing buttress assembly, and the inner axle mounts are attached to a sheet metal upright having a slot with a non-vertical, angled top portion.

12. The framework assembly as set forth in claim 9 wherein the central uprights each define a sheet metal member defining a folded shape with an inboard wall and outboard wall, the outboard wall including a slot that captures an axle end of one of the outer idlers, respectively, and the inboard wall defining one of the slots arranged to allow the respective axle ends of the central idler to pass approximately vertically into and out of the slots.

13. The framework assembly as set forth in claim 9 wherein the outer axle mounts define sockets sized and arranged to axially receive the inboard axle end of each of the outer idlers, respectively.

14. The framework assembly as set forth in claim 13 wherein the central uprights, the inner axle mounts and the outer axle mounts define a unitary metal structure secured to the base.

15. A method for replacing the outer idlers in a framework assembly that supports a central idler and outer idlers in a trough arrangement having,
   a base and outer uprights adjacent to each of opposing ends of the base,
   central uprights remote from the opposite ends,
   inner axle mounts on the central uprights that each receive a respective axle end of the central idler,
   outer axle mounts on the central upright that each receive an inboard axle end of each of the outer idlers, respectively, and
   a hinged axle mount on each of the outer uprights that rotate into and out of engagement with an outboard axle end of each of the outer idlers, respectively, the method comprising the steps of:
   rotating the hinged axle mount to disengage from the outboard axle end of at least one of the outer axle mount, respectively;
   withdrawing the at least one of the outer idlers from the one of the outer axle mounts, respectively;
   placing a new replacement outer idler into the one of the outer axle mounts, respectively; and
   rotating the hinged axle mount into an inboard axle end of the replacement outer idler.

16. The method as set forth in claim 15, further comprising, selectively removing the fixation structure to unlock and attaching the fixation structure to lock the hinged axle mount.

17. The method as set forth in claim 15 wherein at least one of the central uprights and the outer uprights are formed by cutting and folding sheet metal plate.

18. The method as set forth in claim 17, further comprising, attaching the outer uprights and the central uprights to predetermined locations on one or more angle irons that define the base by welding.

* * * * *